L. W. Mayer,

Grape Vine Cutter.

No. 86,681. Patented Feb. 9, 1869.

Witnesses:
Geo. H. Strong
J. L. Boone

Inventor:
L. W. Mayer
G. Dewey & Co.
Attorneys

United States Patent Office.

LOUIS W. MAYER, OF SONOMA, CALIFORNIA.

Letters Patent No. 86,681, dated February 9, 1869.

IMPROVEMENT IN MACHINE FOR CUTTING GRAPE-VINES.

The Schedule referred to in these Letters Patent and making part of the same.

*To all whom it may concern:*

Be it known that I, LOUIS W. MAYER, of Sonoma, county of Sonoma, State of California, have invented an Improved Machine for Cutting Grape-Vines; and I do hereby declare the following description and accompanying drawings are sufficient to enable any person skilled in the art or science to which it most nearly appertains, to make and use my said invention or improvements without further invention or experiment.

The object of my invention is to provide a machine for cutting grape-vines, which have been pruned from the main vine, into small pieces, in order that they may be useful as a manure, by being turned under by the plow and allowed to rot, thus restoring to the soil the substance which is drawn from it to produce the vines.

It is a well-known fact that where grapes are grown for a series of years upon the same spot, the soil will lose, in a great measure, that substance which is required to nourish them, and unless some means be devised to restore that principle or substance, the land will finally become worthless for that purpose, and my object is to restore it by cutting up the vines and allowing them to rot and become a manure.

My machine consists of a frame mounted upon broad-faced wheels, furnished with inside gearing, in which pinions operate for driving the knives or cutters, which are attached at intervals around the pinion-shaft, and stand at an angle. A stationary knife is also attached to the axle of the wheels. Passing across the frame, back of the wheels, and turning loosely on small axles at each end, which have their bearing in the side timbers of the frame, is a shaft, from which long curved fingers, which sweep to the ground in front, depend, and gather up the vines. To one of the wheels, and near its face or rim, is attached an arm, which carries a series of shorter curved fingers, which, passing around with the wheel, take up the vines from the long fingers, and drop them into a trough over the knives, where they are caught by the knives and cut into small chips, which fall to the ground beneath.

To more fully illustrate and describe my invention, reference is had to the accompanying drawings, forming a part of this specification, of which—

Figure 1:
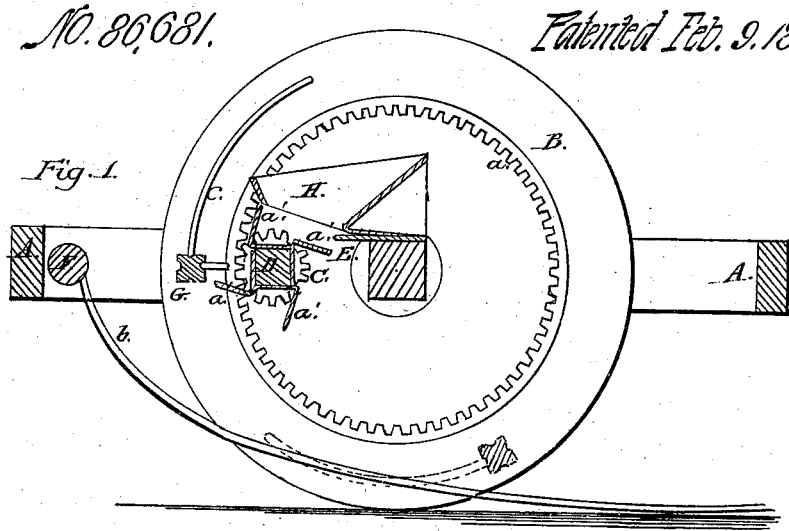
Figure 2:
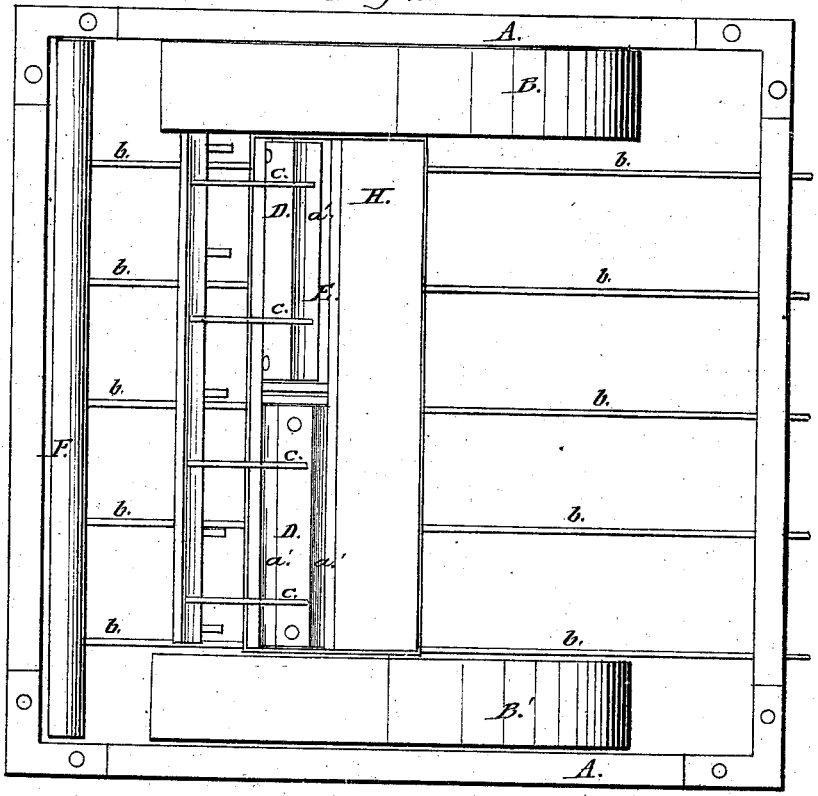

Figure 1 is a side sectional elevation of my machine.
Figure 2 is a plan.

The frame A is mounted upon the two broad-faced wheels B B', which are provided with inside gearing $a$, as shown.

The pinions C C engage in this gearing, and carry the two shafts D D, which have their bearings in the centre and at each end, the one revolving independent of the other.

These shafts carry the knives or cutters $a'\ a'\ a'$, which are set at the proper angle.

Attached to the axle of the wheels is a knife, E, between which and the knives $a'\ a'\ a'$ the vines fall and are cut.

A shaft or roller, F, works loosely across the frame, back of the wheels B B', and has, depending from it in a curve, a series of long fingers, $b\ b\ b$, which sweep along the ground to the front of the machine, and take up the vines after they have been pruned and allowed to fall to the ground.

An arm, G, is attached to one of the wheels near its periphery, and extends across to near the wheel on the opposite side, and carries a series of short curved fingers, $c\ c\ c$, which, passing around with the wheel in an opposite direction to the travel of the machine, enter between the long fingers $b\ b\ b$, taking up the vines, and depositing them in a trough, H, above the knives, from whence they are fed between the knives, and cut into small bits or chips, and fall to the ground, to be plowed under.

Having thus described my invention,

What I claim as new, and desire to secure by Letters Patent, is—

1. The vine-cutter, consisting of the stationary knife E and the revolving knives $a'\ a'\ a'$, or equivalent device, together with the feeding-hopper or trough H, the whole constructed and operating substantially as and for the purpose herein described.

2. The long curved fingers $b\ b\ b$ for taking up the vines, together with the revolving arm G and its fingers $c\ c\ c$, or equivalent device, for carrying the vines to the feeding trough or hopper, substantially as herein described.

In witness whereof, I have hereunto set my hand and seal.

L. W. MAYER. [L. S.]

Witnesses:
J. L. BOONE,
GEO. H. STRONG.